(No Model.)

R. C. ELDRIDGE.
CURRYCOMB.

No. 564,367.  Patented July 21, 1896.

WITNESSES:
Chas. F. Burkhardt
Henry L. Deck

R. C. Eldridge  INVENTOR.
By Wilhelm Bonner
ATTORNEYS.

UNITED STATES PATENT OFFICE.

REUBEN C. ELDRIDGE, OF NIAGARA, CANADA.

CURRYCOMB.

SPECIFICATION forming part of Letters Patent No. 564,367, dated July 21, 1896.

Application filed August 16, 1895. Serial No. 559,444. (No model.)

*To all whom it may concern:*

Be it known that I, REUBEN C. ELDRIDGE, a subject of the Queen of Great Britain, residing at Niagara Falls, in the Province of Ontario, Canada, have invented new and useful Improvements in Currycombs, of which the following is a specification.

This invention relates to that class of currycombs in which the body of the comb is reversible and provided on one side with serrated surfaces and on the other with plain surfaces, so that the plain face of the comb may be used for removing dust, water, or perspiration from the animal and the serrated face for thoroughly cleaning the animal.

The invention has more especial reference to currycombs which consist of a series of concentric rings or bands of sheet metal.

My invention has for its objects to produce a currycomb of this kind which can be readily reversed for presenting either of its faces without requiring the detachment of the handle or strap, and to provide the concentric rings of the comb with simple means for holding them in their proper relative positions.

Figure 1:
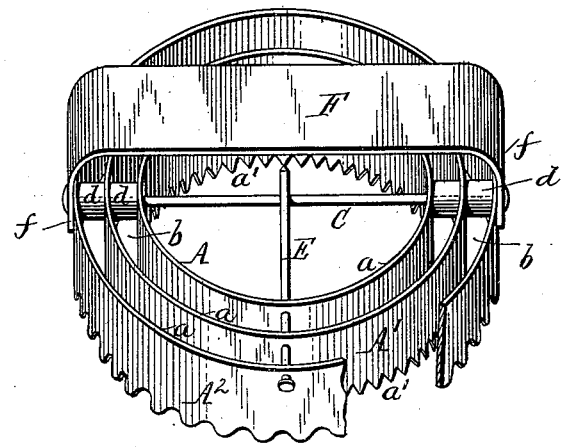
Figure 2:
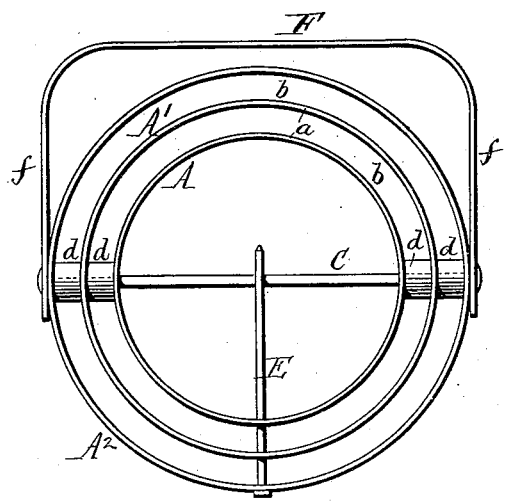

In the accompanying drawings, Figure 1 is a perspective view of my improved currycomb, showing the body in its normal position, in which it presents its serrated face, a portion of the outer ring being broken away. Fig. 2 is a bottom plan view thereof, showing the body reversed for presenting its plain face.

Like letters of reference refer to like parts in both figures.

The body of the comb is preferably composed of a number of concentric sheet-metal rings or bands A A' A$^2$, separated by intervening spaces $b$, and mounted reversibly on a cylindrical axle or spindle C, which passes diametrically through the several rings, and is arranged loosely in corresponding openings formed in the rings, so that the latter are free to turn on the spindle. The edges of the several rings are plain or smooth on one side of the comb-body, as shown at $a$, while their opposite edges are serrated or provided with teeth $a'$, so that the body presents a plain or scraping face on one side and a cleaning face on the other.

$d$ represents washers or tubular filling-pieces which surround the spindle between the rings and whereby the latter are held at the proper distance apart.

E is a retaining-pin, whereby the rings of the comb are held in their proper relative positions and compelled to turn together in reversing the comb-body. This pin passes radially through openings formed in the rings on one side of the spindle, and consists, preferably, of an ordinary wire nail, as shown in the drawings, thus forming a simple and cheap connection between the rings.

F is the handle, strap, or bail through which the hand is passed, and which is preferably constructed of sheet metal. This bail is approximately U-shaped, and its side portions $f$ are pivoted to the projecting end portions of the spindle C, the ends of the latter being headed or upset for retaining the bail upon the spindle, as shown. The angular or side portions of the bail are of such a length that the main portion thereof which connects such angular portions extends beyond and clears the outer ring of the comb-body when the bail is swung or folded in the plane of the body, as shown in Fig. 2. This construction permits the comb-body to be reversed in the bail or handle for presenting either face thereof to the animal, by simply giving it a half-turn in the bail, and without necessitating the removal of one or both ends of the bail from the comb-body.

In using the comb, the hand is passed through the bail or handle, and the upper side of the comb-body is grasped in the same manner as an ordinary single-faced currycomb. When the comb is reversed to present its plain face, the hand bears upon the serrated edge of the outer ring, and in order to avoid injury to the hand the teeth of said ring are made blunt or rounded, as shown in Fig. 1.

In the drawings the bands or rings of the comb-body are represented as being circular, but it is obvious that they might be elliptical, hexagonal, or of any other suitable form.

I claim as my invention—

1. A currycomb having a body composed of a number of concentric rings, a cylindrical axle or spindle passing diametrically through corresponding openings in the several rings, whereby the rings are free to turn on the spindle, a handle or bail pivoted at its ends upon opposite ends of the spindle and capable of swinging clear of the body, whereby the latter can be reversed in the bail, and a retaining device, independent of the spindle and the bail, which holds said rings in the proper position relatively to one another, substantially as set forth.

2. A currycomb having a body composed of a number of concentric rings, a cylindrical axle or spindle passing diametrically through corresponding openings in the several rings, whereby the rings are free to turn on the spindle, a handle or bail permanently pivoted at its ends upon opposite ends of the spindle and capable of swinging clear of the outermost ring of the body, whereby the latter can be reversed in the bail without detaching either end of the bail from the spindle, and a retaining-pin, independent of the spindle and the bail, for connecting the several rings, whereby the latter are retained in the proper position relatively to one another and at the same time permitted to turn collectively on the spindle, substantially as set forth.

Witness my hand this 6th day of August, 1895.

REUBEN C. ELDRIDGE.

Witnesses:
W. F. MILLER,
E. T. ESHELMAN.